(12) United States Patent
Kwang et al.

(10) Patent No.: US 8,566,754 B2
(45) Date of Patent: Oct. 22, 2013

(54) DUAL-PURPOSE PERTURBATION ENGINE FOR AUTOMATICALLY PROCESSING PATTERN-CLIP-BASED MANUFACTURING HOTSPOTS

(75) Inventors: Kent Y. Kwang, Saratoga, CA (US);
Daniel Zhang, Milpitas, CA (US);
Zongwu Tang, Pleasanton, CA (US);
Subarnarekha Sinha, Menlo Park, CA (US)

(73) Assignee: Synopsys, Inc., Mountain View, CA (US)

( * ) Notice: Subject to any disclaimer, the term of this patent is extended or adjusted under 35 U.S.C. 154(b) by 614 days.

(21) Appl. No.: 12/275,887

(22) Filed: Nov. 21, 2008

(65) Prior Publication Data

US 2009/0268958 A1    Oct. 29, 2009

Related U.S. Application Data

(63) Continuation-in-part of application No. 12/109,118, filed on Apr. 24, 2008.

(51) Int. Cl.
*G06F 17/50* (2006.01)

(52) U.S. Cl.
USPC ............................................. 716/52; 716/53

(58) Field of Classification Search
USPC ..................................................... 716/52, 53
See application file for complete search history.

(56) References Cited

U.S. PATENT DOCUMENTS

| | | | |
|---|---|---|---|
| 2003/0061592 A1* | 3/2003 | Agrawal et al. | 716/19 |
| 2003/0163791 A1* | 8/2003 | Falbo et al. | 716/2 |
| 2003/0203287 A1* | 10/2003 | Miyagawa | 430/5 |
| 2004/0103388 A1* | 5/2004 | Aleshin et al. | 716/20 |
| 2007/0198958 A1 | 8/2007 | Tang | |
| 2007/0240086 A1 | 10/2007 | Sinha | |
| 2008/0098341 A1* | 4/2008 | Kobayashi et al. | 716/9 |
| 2008/0189673 A1* | 8/2008 | Ying | 716/21 |

OTHER PUBLICATIONS

Yao et al., "Efficient range pattern matching algorithm for process-hotspot detection", IET Circuits, Devices & Systems, Feb. 2008, vol. 2 issue 1, pp. 2-15.*
Yao et al., "Efficient Process-hotspot Detection Using Range Pattern Matching", ICCAD 2006, Nov. 5-9, 2006, pp. 626-632.*
"Geometric Primitive." Wikipedia, the Free Encyclopedia. Mar. 30, 2008. Web. Accessed Feb. 13, 2012. <http://en.wikipedia.org/w/index.php?title=Geometric_primitive>.*

(Continued)

*Primary Examiner* — Vuthe Siek
*Assistant Examiner* — Aric Lin
(74) *Attorney, Agent, or Firm* — Park, Vaughan, Fleming & Dowler LLP

(57) ABSTRACT

One embodiment of the present invention provides a system that automatically processes manufacturing hotspot information. During operation, the system receives a pattern clip associated with a manufacturing hotspot in a layout, wherein the pattern clip comprises a set of polygons in proximity to the manufacturing hotspot's location. Next, the system determines if the pattern clip matches a known manufacturing hotspot configuration. If the pattern clip does not match a known manufacturing hotspot configuration, the system then performs a perturbation process on the pattern clip to determine a set of correction recommendations to eliminate the manufacturing hotspot. By performing the perturbation process, the system additionally determines ranges of perturbation to the set of polygons wherein the perturbed pattern clip does not eliminate the manufacturing hotspot. Subsequently, the system stores the set of correction recommendations and the ranges of perturbation into a manufacturing hotspot database.

21 Claims, 8 Drawing Sheets

(56) References Cited

OTHER PUBLICATIONS

Ma, Ning et al., "Automatic Hotspot Classification using pattern-based clustering", XP-0025368, Proc. of SPIE vol. 6925, 692505, (2008).

Yao, H. et al., "Efficient range pattern matching algorithm for process-hotspot detection", IET Circuits Devices Syst., 2, (1), pp. 2-15.

* cited by examiner

DUAL-PURPOSE PERTURBATION ENGINE FOR AUTOMATICALLY PROCESSING PATTERN-CLIP-BASED MANUFACTURING HOTSPOTS

RELATED APPLICATION

This application is a continuation-in-part of, and hereby claims priority under 35 U.S.C. §120 to, U.S. patent application Ser. No. 12/109,118, entitled "Pattern-clip-based Hotspot Database System for Layout Verification," by inventors Zongwu Tang et al., filed 24 Apr. 2008, (pending).

BACKGROUND

1. Field of the Invention

Embodiments of the present invention generally relate to semiconductor manufacturing. More specifically, embodiments of the present invention relate to a method and a system that automatically processes a pattern-clip-based manufacturing hotspot to determine both correction guidance descriptions for correcting the manufacturing hotspot and qualified ranges for the pattern clip to remain a manufacturing hotspot.

2. Related Art

Advances in IC manufacturing technology have enabled minimum feature sizes on IC chips to continuously decrease. In fact, the current minimum feature size is smaller than the wavelengths of light used in conventional optical imaging systems. Accordingly, it is becoming increasingly difficult to achieve reasonable fidelity, which is often expressed in resolution and depth of focus, between a designed layout and the shapes of actual fabricated circuit elements. Existing reticle enhancement technologies (RETs), such as optical proximity correction (OPC), phase-shifting masks (PSMs), and sub-resolution assist features (SRAFs), are becoming inadequate to solve fabrication issues on the nanometer scale.

Manufacturability-aware physical design, which takes into account both yield and reliability during the physical-design process, is becoming increasingly important in bridging the gap between design and manufacturing for nanometer-scale fabrication processes. Many yield and reliability issues can be attributed to certain layout configurations, referred to as "manufacturing hotspots" (also referred to as "process hotspot" or simply "hotspots"), which are susceptible to manufacturing process issues, such as stress and lithographic process fluctuations. For example, an increasing number of lithography-related manufacturing hotspots caused by increasing design complexity have become one of the main yield limiters of sub-65 nm IC designs. It is therefore desirable to identify and remove these process-related yield limiters from IC designs before design tapeout and replace them with more yield-friendly layout configurations.

Unfortunately, automatic techniques for modifying a layout to resolve the identified manufacturing hotspots are typically not available to the designers. Note that while manufacturers can routinely publish new "pattern clips" (clips of the layout which are associated with manufacturing hotspots) to make them available to designers, a pattern clip itself is not sufficient for designers to make correction decisions for the associated hotspot. This is because each hotspot is caused by the proximity effect associated with the entire pattern clip, and the hotspot configuration does not indicate which of the constituent geometries need to be altered to remove or reduce the severity of the hotspot.

Furthermore, note that often similar pattern clips provided by manufacturers constitute a hotspot range, within which a particular type of hotspot is considered "valid." However, automatic techniques for determining a valid hotspot range (or ranges) based on a given pattern clip are also not available to the designers. Without such automatic techniques, processing a large number of manufacturer-provided pattern clips becomes extremely time consuming and redundant.

Hence, what is needed is a method and a system that can automatically process pattern-clip-based manufacturing hotspots without the above-described problems.

SUMMARY

One embodiment of the present invention provides a system that automatically processes manufacturing hotspot information. During operation, the system receives a pattern clip associated with a manufacturing hotspot in a layout, wherein the pattern clip comprises a set of polygons in proximity to the manufacturing hotspot's location. Next, the system determines if the pattern clip matches a known manufacturing hotspot configuration. If the pattern clip does not match a known manufacturing hotspot configuration, the system then performs a perturbation process on the pattern clip to determine a set of correction recommendations to eliminate the manufacturing hotspot. By performing the perturbation process, the system additionally determines ranges of perturbation to the set of polygons wherein the perturbed pattern clip does not eliminate the manufacturing hotspot. Subsequently, the system stores the set of correction recommendations and the ranges of perturbation into a manufacturing hotspot database.

In a variation on this embodiment, prior to performing the perturbation operation, the system preprocesses the pattern clip by: fracturing the set of polygons into a set of primitive geometries; identifying a geometrical relationship of the manufacturing hotspot with each of the set of primitive geometries; and constructing a priority list for the set of primitive geometries based on the identified geometrical relationship, wherein the priority list determines an order of importance of the set of primitive geometries.

In a further variation on this embodiment, the set of primitive geometries is a set of trapezoids.

In a further variation, the system records connectivity information among the set of primitive geometries.

In a further variation, if the pattern clip matches a known manufacturing hotspot configuration, the system corrects the pattern clip using a set of correction recommendations associated with the matched manufacturing hotspot configuration.

In a further variation, the system performs the perturbation process on the pattern clip to determine the set of correction recommendations by: selecting a primitive geometry from the set of primitive geometries; identifying a set of movable edges for the primitive geometry; and, for each identified movable edge, perturbing the movable edge to search for a correction recommendation associated with the movable edge.

In a further variation, the system selects the primitive geometry based on the associated priority specified in the priority list.

In a further variation, the system perturbs the movable edge to search for the correction recommendation by first selecting a direction for the movable edge which is likely to reduce the severity of the manufacturing hotspot. The system then moves the movable edge in the selected direction by a predetermined amount to obtain a perturbed pattern clip. Next, the system computes a hotspot score for the perturbed pattern clip, wherein the hotspot score measures the severity of the manufacturing hotspot. The system then determines if the hotspot score is less than a threshold. If so, the system records a difference between the unperturbed pattern clip and the perturbed pattern clip as the correction recommendation associated with the movable edge. Otherwise, the system continues perturbing the movable edge in the selected direction.

In a further variation, prior to computing the hotspot score for the perturbed pattern clip, the system also checks the perturbed pattern clip against a set of constraints. If the perturbed pattern clip violates one of the set of constraints, the system determines that the movable edge is not associated with a corresponding correction recommendation.

In a further variation, the system performs the perturbation process on the pattern clip to determine ranges of perturbation to the set of polygons which do not eliminate the manufacturing hotspot by: selecting a primitive geometry from the set of primitive geometries; identifying a set of movable edges for the primitive geometry; and, for each identified movable edge, perturbing the movable edge to search for a valid hotspot range associated with the movable edge.

In a further variation, the system searches for both a minimum edge position and a maximum edge position associated with the perturbed movable edge.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Figure 1:
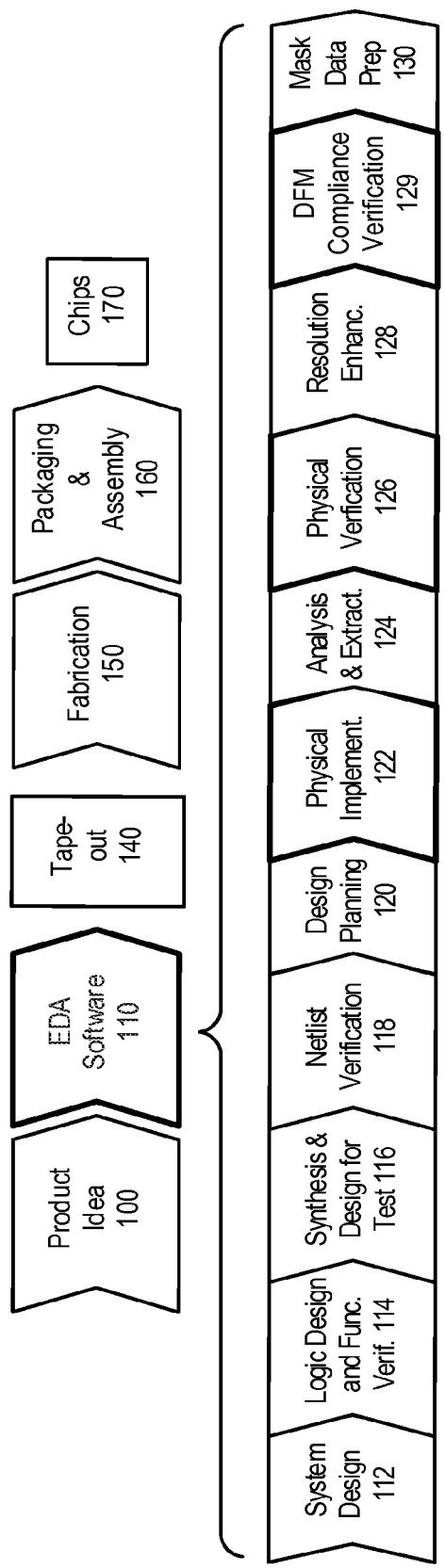
FIG. 1 illustrates various stages in the design and fabrication of an integrated circuit.

FIG. 1 illustrates various stages in the design and fabrication of an integrated circuit. The process starts with the generation of a product idea (stage 100), which is realized using an Electronic Design Automation (EDA) software design process (stage 110). When the design is finalized, it can be taped-out (stage 140). After tape-out, the fabrication process is consummated (stage 150) and packaging and assembly processes (stage 160) are performed which ultimately result in finished chips (stage 170).

The EDA software design process (stage 110), in turn, comprises stages 112-130, which are described below. Note that this design flow description is for illustration purposes only. This description is not meant to limit the present invention. For example, an actual integrated circuit design may require a designer to perform the design stages in a different sequence than the sequence described herein. The following discussion provides further details of the stages in the design process.

System design (stage 112): The designers describe the functionality to implement. They can also perform what-if planning to refine the functionality and to check costs. Hardware-software architecture partitioning can occur at this stage. Exemplary EDA software products from SYNOPSYS, INC. that can be used at this stage include MODEL ARCHITECT®, SABER®, SYSTEM STUDIO®, and DESIGNWARE® products.

Logic design and functional verification (stage 114): At this stage, the VHDL or Verilog code for modules in the system is written and the design is checked for functional accuracy. More specifically, the design is checked to ensure that it produces the correct outputs. Exemplary EDA software products from SYNOPSYS, INC. that can be used at this stage include VCS®, VERA®, DESIGNWARE®, MAGELLAN®, FORMALITY®, ESP® and LEDA® products.

Synthesis and design (stage 116): Here, the VHDL/Verilog is translated to a netlist. The netlist can be optimized for the target technology. Additionally, tests can be designed and implemented to check the finished chips. Exemplary EDA software products from SYNOPSYS, INC. that can be used at this stage include DESIGN COMPILER®, PHYSICAL COMPILER®, TEST COMPILER®, POWER COMPILER®, FPGA COMPILER®, TETRAMAX®, and DESIGNWARE® products.

Netlist verification (stage 118): At this stage, the netlist is checked for compliance with timing constraints and for correspondence with the VHDL/Verilog source code. Exemplary EDA software products from SYNOPSYS, INC. that can be used at this stage include FORMALITY®, PRIMETIME®, and VCS® products.

Design planning (stage 120): Here, an overall floor plan for the chip is constructed and analyzed for timing and top-level routing. Exemplary EDA software products from SYNOPSYS, INC. that can be used at this stage include ASTRO® and IC COMPILER® products.

Physical implementation (stage 122): The placement (positioning of circuit elements) and routing (connection of the same) occurs at this stage. Exemplary EDA software products from SYNOPSYS, INC. that can be used at this stage include the ASTRO® and IC COMPILER® products.

Analysis and extraction (stage 124): At this stage, the circuit function is verified at a transistor level; this in turn permits what-if refinement. Exemplary EDA software products from SYNOPSYS, INC. that can be used at this stage include ASTRORAIL®, PRIMERAIL®, PRIMETIME®, and STAR RC/XT® products.

Physical verification (stage 126): In this stage, the design is checked to ensure correctness for manufacturing, electrical issues, lithographic issues, and circuitry. Exemplary EDA software products from SYNOPSYS, INC. that can be used at this stage include the HERCULES® product.

Resolution enhancement (stage 128): This stage involves geometric manipulations of the layout to improve manufacturability of the design. Exemplary EDA software products from SYNOPSYS, INC. that can be used at this stage include PROTEUS®, PROTEUS®AF, and PSMGEN® products.

DFM compliance verification (stage 129): In this stage, the design (mask layout) is checked to ensure correctness for manufacturing, electrical issues, mechanical stress issues, lithographic issues, and circuitry. Exemplary EDA software products from SYNOPSYS, INC. that can be used at this stage include the PRIMEYIELD®, SIVL®, and SEISMOS® products.

Mask data preparation (stage 130): This stage provides the "tape-out" data for production of masks to produce finished chips. Exemplary EDA software products from SYNOPSYS, INC. that can be used at this stage include the CATS® family of products.

Embodiments of the present invention can be used during one or more of the above-described stages. Specifically, one embodiment of the present invention can be used during physical implementation stage 122, physical verification stage 126, and DFM compliance verification stage 129.

A Pattern-Clip-Based Layout Verification Environment

Figure 2:
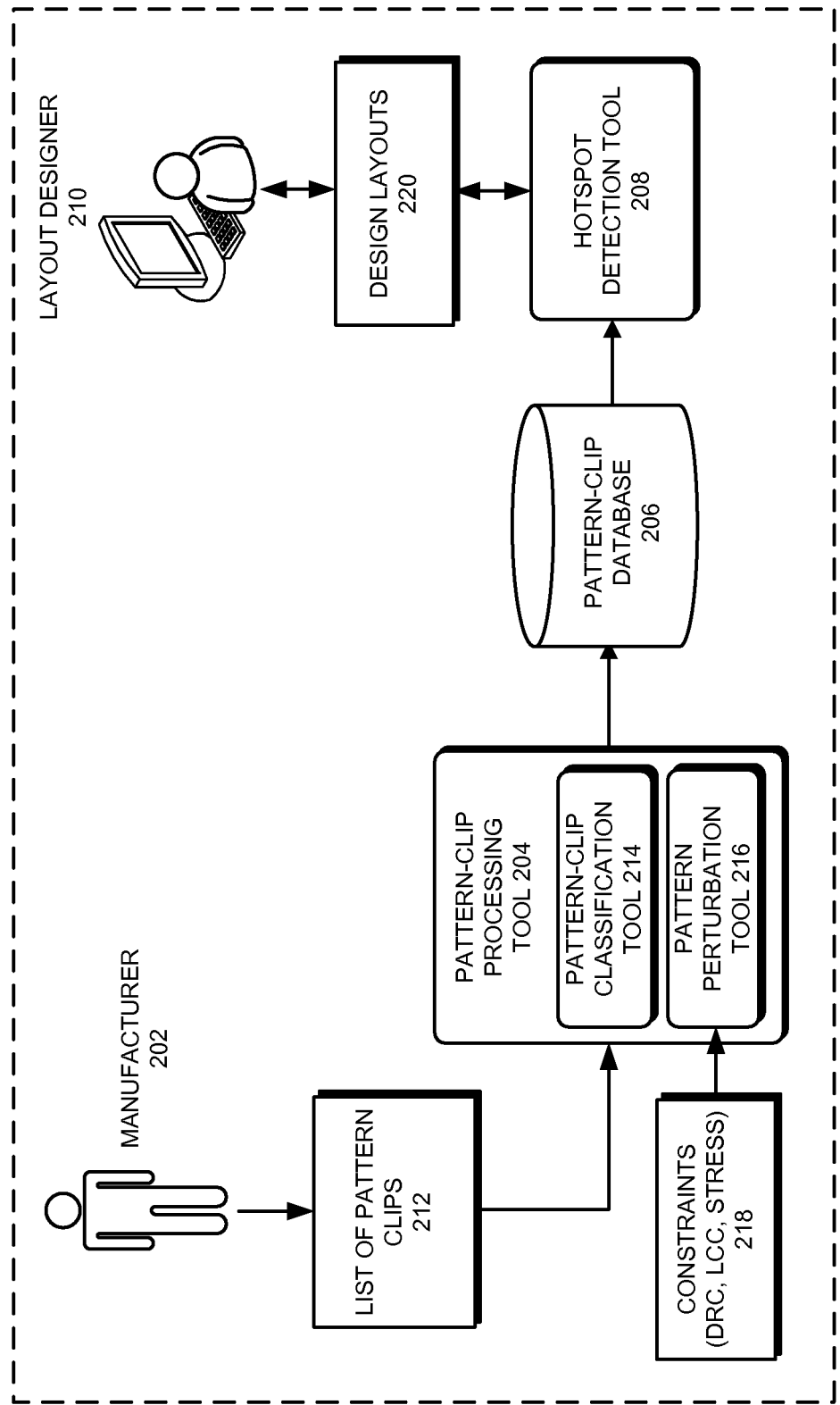
FIG. 2 presents a diagram illustrating a pattern-clip-based layout verification system in accordance with an embodiment of the present invention.

FIG. 2 presents a diagram illustrating a pattern-clip-based layout verification system 200 in accordance with an embodiment of the present invention. System 200 is associated with a manufacturer 202, a pattern-clip processing tool 204, a pattern-clip database 206, a hotspot detection tool 208 and a layout designer 210.

During operation, manufacturer 202 provides list of pattern clips 212 which specify manufacturing hotspots to be avoided in a layout. Note that manufacturer 202 can provide the list by publishing the list in a user's manual, as a GUI input, or as a foundry verification tool output. Note that list of pattern clips 212 may be encrypted so that only authorized users can decrypt the pattern clips. Note also that this list of pattern clips is typically manufacturer-specific because the pattern clips are generated from the specific manufacturing tools.

Figure 3:
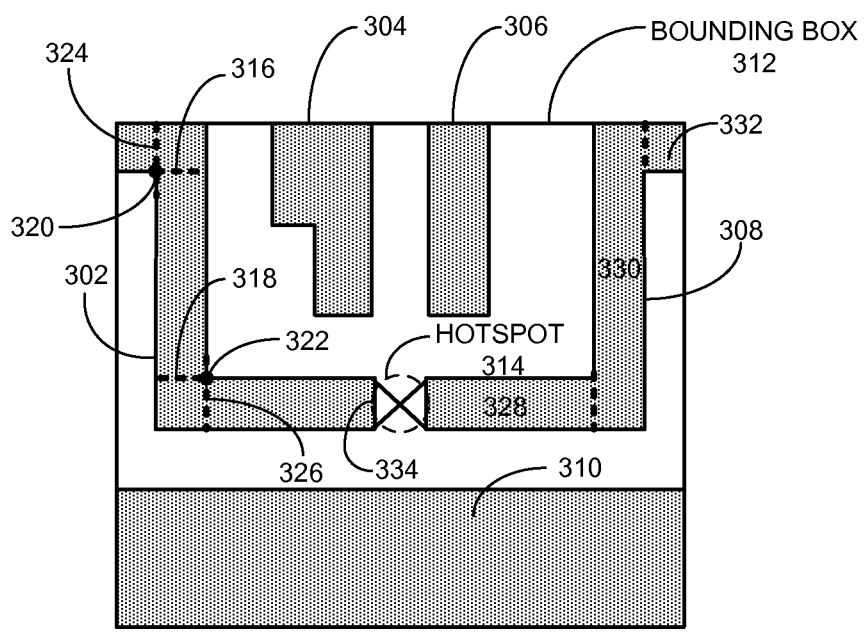
FIG. 3 illustrates an exemplary pattern clip specifying a bridging-type hotspot.

FIG. 3 illustrates an exemplary pattern clip 300 specifying a bridging-type hotspot. Note that pattern clip 300 comprises five polygons 302-310 within a bounding box 312. A bridging hotspot 314 is marked within or near the gap between polygons 302 and 308. Note that this bridging hotspot can cause polygons 302 and 308 to connect when printed onto a wafer, which can lead to a short circuit. Also note that this bridging hotspot may not be detectable as a design rule violation or another constraint violation. In contrast, bridging hotspot 314 is caused by the "proximity effect," which arises from the particular configuration of the set of polygons 302-310 in the vicinity of hotspot 314. From the manufacturer's perspective, this proximity effect can be an aggregation of individual effects, such as the lithographic error, from each constituent polygon in the set of polygons. Hence, it is extremely difficult for the bridging hotspot in FIG. 3 to be described by a set of design rules. Note that other pattern clips can include a larger or smaller set of polygons than pattern clip 300.

Referring back to FIG. 2, list of pattern clips 212 becomes the input to pattern-clip processing tool 204. In some embodiments of the present invention, pattern-clip processing tool 204 includes a pattern-clip classification tool 214 for classifying each manufacturer-provided pattern-clip-based hotspot ("pattern clip" hereafter) into one of the pre-defined set of hotspot categories. In one embodiment, pattern-clip classification tool 214 includes a preprocessing mechanism for decomposing a pattern clip into a set of primitive geometries, and establishing connectivity information and priority information for the set of primitive geometries. Note that pattern-clip classification tool 214 can determine if a given pattern clip matches a pre-defined hotspot configuration, or if it does not match any of the pre-defined hotspot configurations. We describe the operation of pattern-clip classification tool 214 in more detail below in conjunction with FIG. 4.

Pattern-clip processing tool 204 further includes a dual-purpose pattern perturbation tool 216 ("pattern perturbation tool 216" hereafter) for generating both the correction guidance descriptions for a given pattern clip and qualified ranges for the pattern clip to remain a manufacturing hotspot. Note that the correction guidance descriptions can include one or more correction recommendations that can be used to correct a respective pattern clip to remove the associated hotspot or to reduce the hotspot severity. In one embodiment of the present invention, pattern perturbation tool 216 is used to process exclusively those new pattern clips which are determined to not match any pre-defined hotspot configuration. We describe pattern perturbation tool 216 in more detail below in conjunction with FIG. 5 and FIG. 6. Note that pattern perturbation tool 216 also receives a set of constraints 218, which can include design constraints which are not to be violated during the pattern-clip perturbation process.

In some embodiments of the present invention, pattern-clip processing tool 204 additionally generates a data structure "patternClip," wherein each instance of patternClip includes a distinctive pattern clip and the corresponding correction guidance descriptions and the qualified hotspot ranges generated by pattern perturbation tool 216.

Pattern-clip processing tool 204 outputs pattern clips along with corresponding correction guidance descriptions and qualified hotspot ranges, and stores them into a pattern-clip database 206. In some embodiments, each database entry is used to store data associated with a unique pattern-clip configuration. Note that when a client queries a stored pattern clip, pattern-clip database 206 can return both the correction guidance descriptions and the qualified hotspot ranges associated with the requested pattern clip.

In one embodiment of the present invention, pattern-clip database 206 is coupled to a client-side hotspot detection tool 208, which is configured to perform layout verification on an input layout. More specifically, hotspot detection tool 208 can detect pattern-clip-based hotspots within the given layout. As illustrated in FIG. 2, hotspot detection tool 208 receives design layouts 220 from layout designer 210. During a verification operation, hotspot detection tool 208 can access pattern-clip database 206 to retrieve pattern clips, the associated correction guidance descriptions, and the qualified hotspot ranges stored in database 206. Hotspot detection tool 208 then scans the input layout to find matches for each of the pattern clips in database 206 based on the qualified hotspot ranges. Each match in a target layout constitutes a layout hotspot. When a hotspot is detected, hotspot detection tool 208 can mark the design features as a violation in the layout. In some embodiments of the present invention, once a hotspot is identified, hotspot detection tool 208 can retrieve correction guidance descriptions associated with the matched pattern clip, and can perform a runtime or offline correction process to remove the hotspot in the layout, or reduce the hotspot severity. Note that hotspot detection tool 208 can return pattern-clip-hotspot-clean versions of design layouts 220 to layout designer 210.

Preprocessing a Raw Input Pattern-Clip

Figure 4:
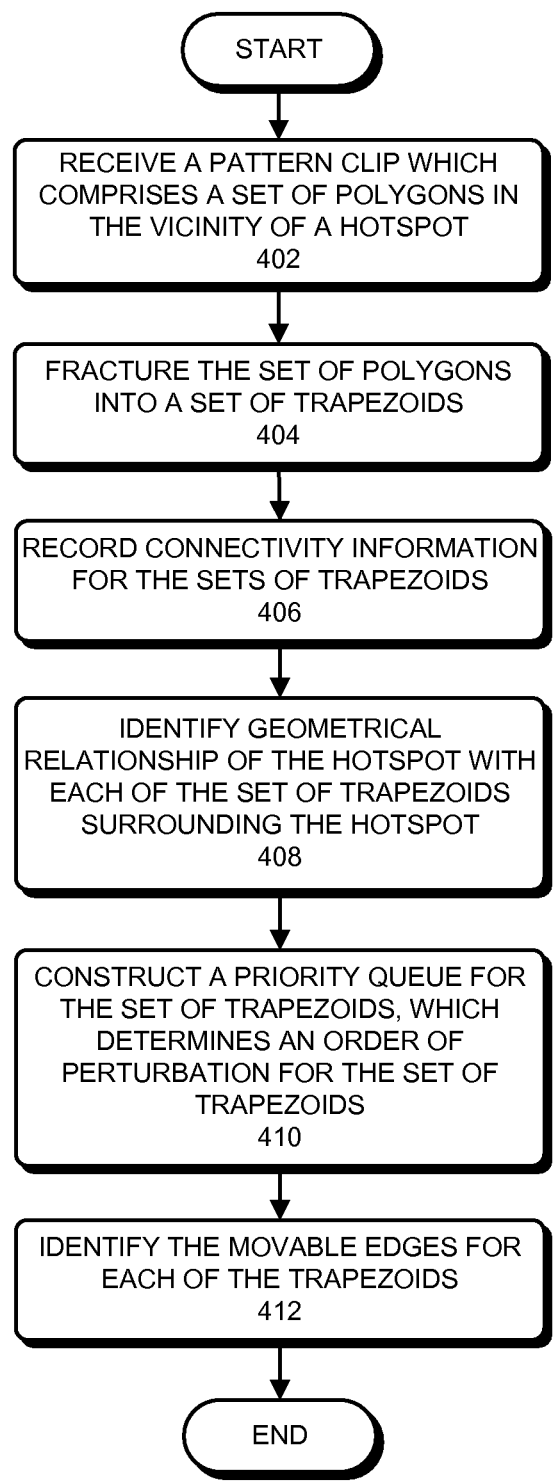
FIG. 4 presents a flowchart illustrating a process of preprocessing a pattern clip in accordance with an embodiment of the present invention.

FIG. 4 presents a flowchart illustrating a process of preprocessing a pattern clip in accordance with an embodiment of the present invention.

During operation, the system receives a pattern-clip-based manufacturing hotspot (i.e., a pattern clip) from a manufacturer, wherein the pattern clip is a clip of a layout comprising a set of polygons in the vicinity of a hotspot (step 402).

Next, the system fractures the set of polygons into a set of trapezoids, wherein each polygon can be fractured into one or more trapezoids (step 404). Note that one goal of this fracturing operation is to break more complex polygons, such as polygons 302 and 308 in FIG. 3, into more primitive geometries. Specifically, the system can use a projection-based fracturing technique to decompose the set of polygons using the vertices. For example, polygon 302 in FIG. 3 can be fractured into three rectangles along the dash lines 316 and 318 which originate from vertices 320 and 322. Note that a given polygon in the pattern clip can be fractured into different sets of trapezoids. For example, polygon 302 can also be decomposed into three rectangles along the dash lines 324 and 326 which originate from the same vertices 320 and 322. While the fracturing operation for the exemplary polygon 302 typically generates a set of rectangles, some fractured pattern clips can include trapezoids, for example, if these pattern clips include 45° and 135° edges. In some embodiments of the present invention, the fractured operation can generate geometries other than trapezoids.

The system then records connectivity information for the sets of trapezoids fractured from the set of polygons (step 406). For example, for polygon 302 in FIG. 3, the connectivity information records that the three resulting rectangles are connected at lines 316 and 318, or at lines 324 and 326, depending on the particular fracturing. Note that during a subsequent perturbation process on the pattern clip, it is necessary to maintain this connectivity for each of the original polygons. Hence, this connectivity information can be used to check for connectivity violations during the perturbation.

Additionally, the system identifies the geometrical relationship of the hotspot location ("hotspot" hereafter) with each trapezoid in the set of trapezoids surrounding the hotspot (step 408). In one embodiment, the geometrical relationship is measured based on the distance between each trapezoid and the hotspot. For example, a rectangle 328 is closer to hotspot 314 than rectangle 330, which is closer to hotspot 314 than rectangle 332. Next, based on the identified geometrical relationship, the system constructs a priority queue for the set of trapezoids, which determines an order of perturbation for the set of trapezoids (step 410). Specifically, trapezoids closer to the hotspot typically make higher impact on the hotspot, and therefore receive higher priorities. For example, in FIG. 3, rectangle 328 may receive the highest priority in the priority queue so that it is perturbed first among the set of trapezoids. In contrast, rectangle 332 may receive a lower priority for perturbation because it is further away from hotspot 314. Note that some trapezoids with the lowest priorities may not need to be perturbed. In one embodiment of the present invention, recording connectivity step 406 can be performed after constructing the priority queue step 410.

After determining the order of perturbation for the set of trapezoids, the system then identifies the movable edges for each of the trapezoids (step 412). In one embodiment, the system first determines if an edge of a trapezoid is an internal edge (i.e., an edge created during fracturing) or an external edge (i.e., an original edge of a polygon). Note that, generally speaking, an internal edge is considered a non-movable edge and hence is not considered during the perturbation. In contrast, an external edge is typically a movable edge. In one embodiment, for each identified movable edge of a trapezoid, the system determines the possible directions of movement for that edge. Typically, each movable edge can move in two opposite directions perpendicular to that edge.

Performing a Dual-Purpose Perturbation on a Preprocessed Pattern Clip

Figure 5:
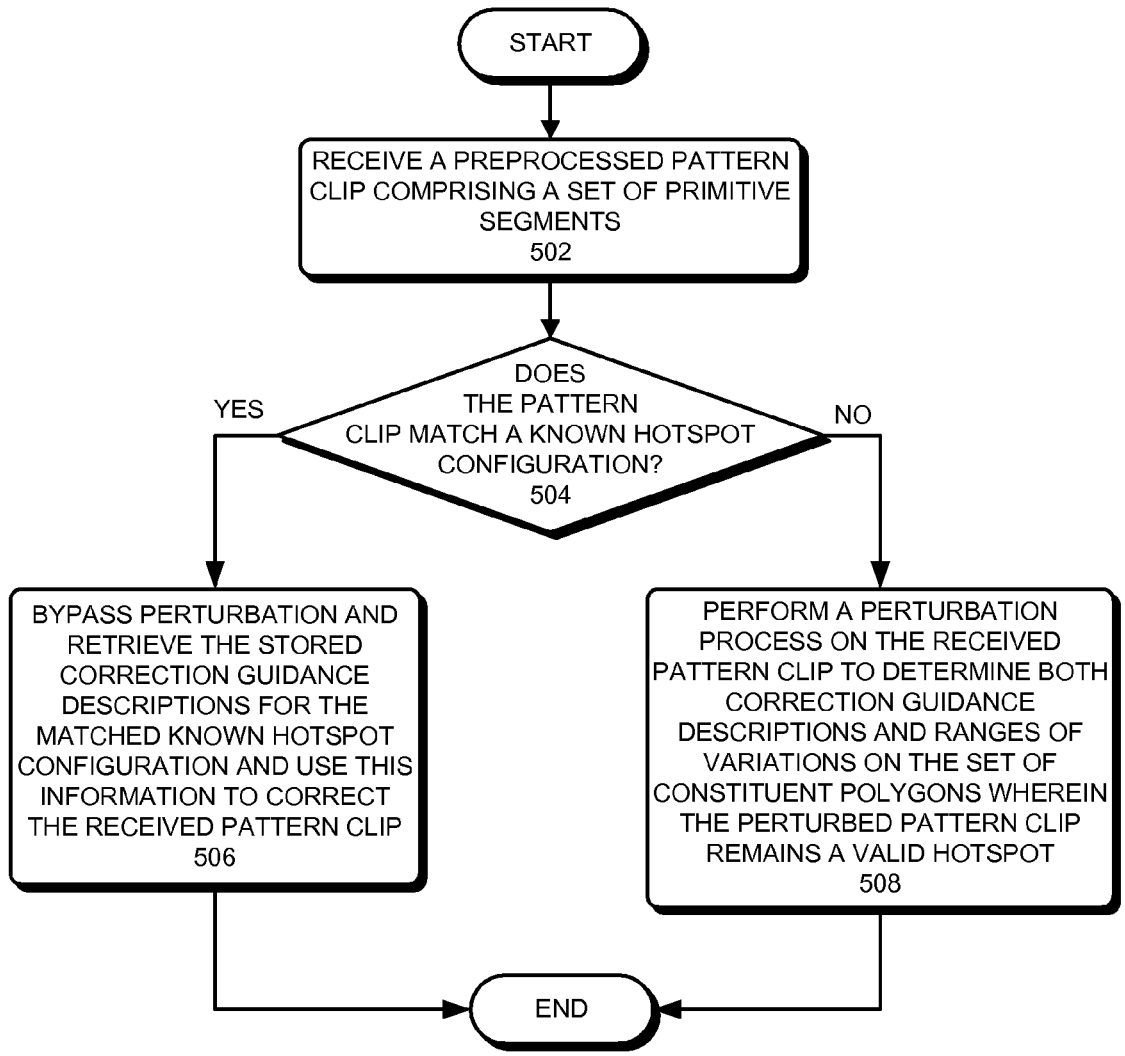
FIG. 5 presents a flowchart illustrating the process of performing a dual-purpose perturbation on a given pattern clip in accordance with an embodiment of the present invention.

FIG. 5 presents a flowchart illustrating the process of performing a dual-purpose perturbation on a given pattern clip in accordance with an embodiment of the present invention.

During operation, the system receives a preprocessed pattern clip comprising a set of trapezoids (step 502). In one embodiment, each preprocessed pattern clip can include the following information: a set of trapezoids (or other primitive geometries), connectivity information among the set of trapezoids, a priority queue which determines the order for perturbing the set of trapezoids, and identified movable edges for each trapezoid in the priority queue.

Next, the system determines if the pattern clip matches a known manufacturing hotspot configuration (step 504). In one embodiment of the present invention, a manufacturing hotspot database stores a set of predefined manufacturing hotspot configurations, and each predefined manufacturing hotspot configuration is associated with a constituent set of trapezoids and the connectivity information for the set of trapezoids. Hence, the system can determine if the newly received preprocessed pattern clip matches a known manufacturing hotspot configuration by performing a geometrically-based comparison between the corresponding trapezoid-based representations for the received preprocessed pattern clip and each of the known hotspot configurations. In another embodiment, the system can perform a direct pattern-matching operation between the original (non-fractured) pattern clip and a known hotspot configuration.

If a match is found, the system then bypasses the perturbation process on the received pattern clip, thereby saving computation resources (step 506). In one embodiment of the present invention, the system can retrieve the stored correction guidance descriptions for the matched known hotspot configuration and use this information to correct the received pattern clip.

If the received pattern clip does not match any known manufacturing hotspot configurations in the set of predefined hotspot configurations, the system subsequently performs a perturbation process on the received pattern clip (step 508). More specifically, the perturbation process determines both correction guidance descriptions for eliminating the manufacturing hotspot from the pattern clip, and ranges of perturbation to the set of constituent polygons wherein the perturbed pattern clip remains a manufacturing hotspot. A detailed perturbation process is described in conjunction with FIG. 6.

Process for Perturbing a Pattern Clip

Figure 6:
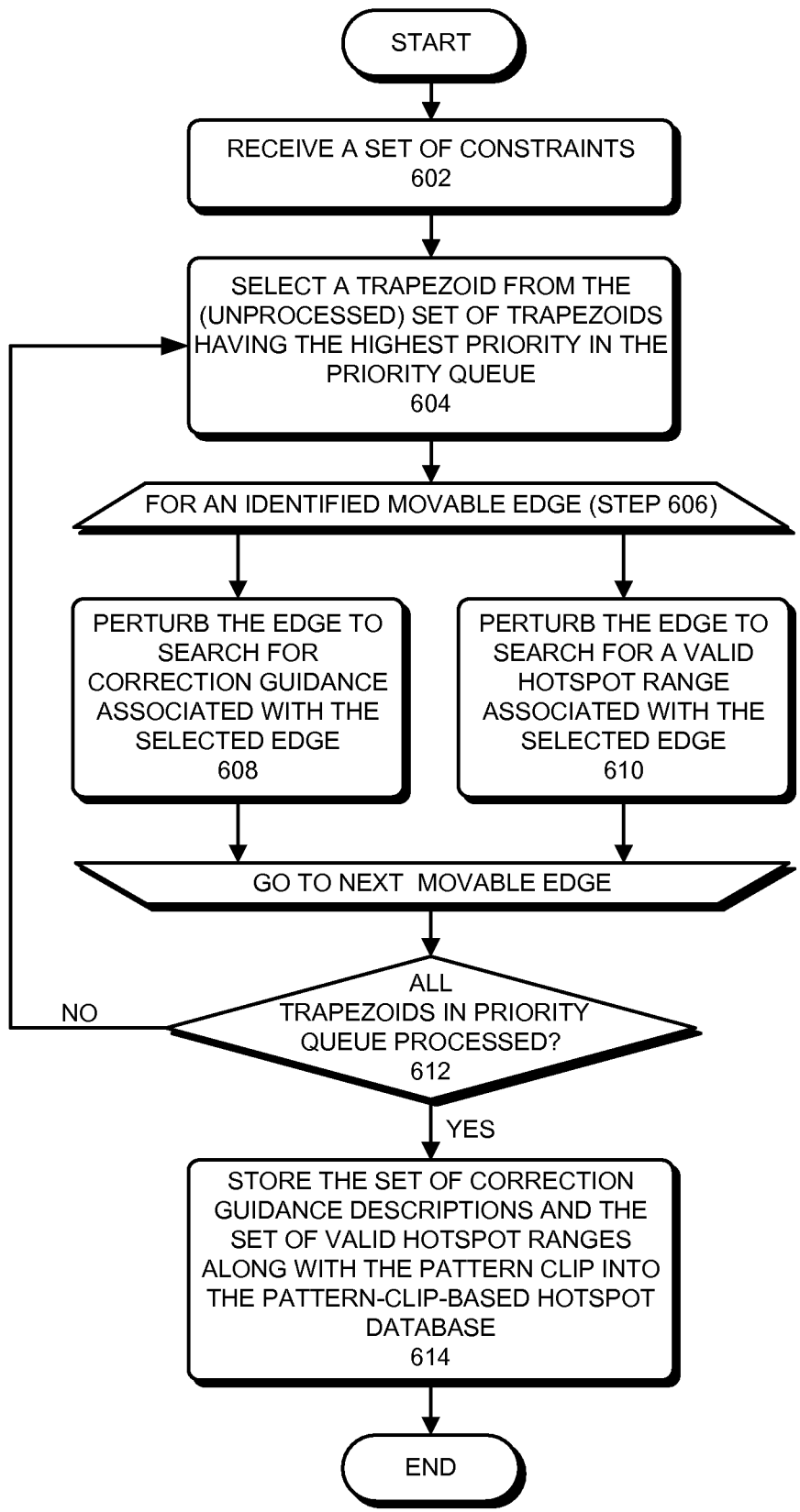
FIG. 6 presents a flowchart illustrating the process of perturbing a trapezoid-based pattern clip representation to determine both valid hotspot ranges and correction guidance for the pattern clip in accordance with an embodiment of the present invention.

FIG. 6 presents a flowchart illustrating the process of perturbing a trapezoid-based pattern clip representation to determine both valid hotspot ranges and correction guidance for the pattern clip in accordance with an embodiment of the present invention. Note that the perturbation is performed on the preprocessed pattern clip which comprises a set of trapezoids.

During operation, the system starts by receiving a set of design constraints (step 602). In some embodiments, this set of constraints includes design rule checking constraints ("DRC" hereafter) and lithographical compliance check constraints ("LCC" hereafter). Note that these constraints are checked during the perturbation process to ensure design integrity is not compromised, which is described in more detail below.

The system then selects a trapezoid from the set of trapezoids having the highest priority in the priority queue (step 604). As described above, the priority of each trapezoid can be determined based on the proximity to the hotspot location. In this embodiment, the trapezoid with the highest priority is the one closest to the hotspot.

Next, the system selects a movable edge from a set of previously identified movable edges for the selected trapezoid (step 606).

At this point, the system begins performing two parallel sub-processes on the selected edge, wherein one sub-process perturbs the edge to search for correction guidance associated with the selected edge (step 608) and the other sub-process perturbs the edge to search for a hotspot range associated with the selected edge (step 610). In some embodiments of the present invention, each movable edge of a trapezoid can produce at most one correction guidance and/or one hotspot range. We describe more detailed operations of the perturbation steps 608 and 610 in conjunction with FIG. 7 and FIG. 8, respectively.

Note that after performing parallel steps 608 and 610, the system returns to step 606 to select the next movable edge for the selected trapezoid. Subsequently, the system repeats steps 606 to 610 for the set of identified movable edges of the selected trapezoid. After processing the selected trapezoid for all the movable edges, the system then determines if all the trapezoids in the priority queue of the pattern clip have been processed (step 612). If not, the system returns to step 604, and selects a trapezoid from the remaining unprocessed trapezoids having the highest priority in the priority queue. Then, the system repeats steps 604-612 for all trapezoids in the priority queue, thereby generating a set of correction guidance for correcting the pattern-clip-based hotspot, and a set of hotspot ranges for which the perturbed pattern clip remains a valid hotspot.

After determining that all the trapezoids in the priority queue of the pattern clip have been processed, the system stores the set of determined correction guidance descriptions, and the set of identified valid hotspot ranges along with the pattern clip into the pattern-clip-based hotspot database (step 614). In some embodiments, the system stores each pattern clip and the associated correction guidance descriptions and valid hotspot ranges as an entry in the database in a patternClip data structure.

Note that the pattern-clip hotspot database can continue to grow in this manner. Once established, the stored pattern clips and the associated correction guidance descriptions and valid hotspot ranges can be quickly queried and retrieved for layout verification and other purposes.

Figure 7:
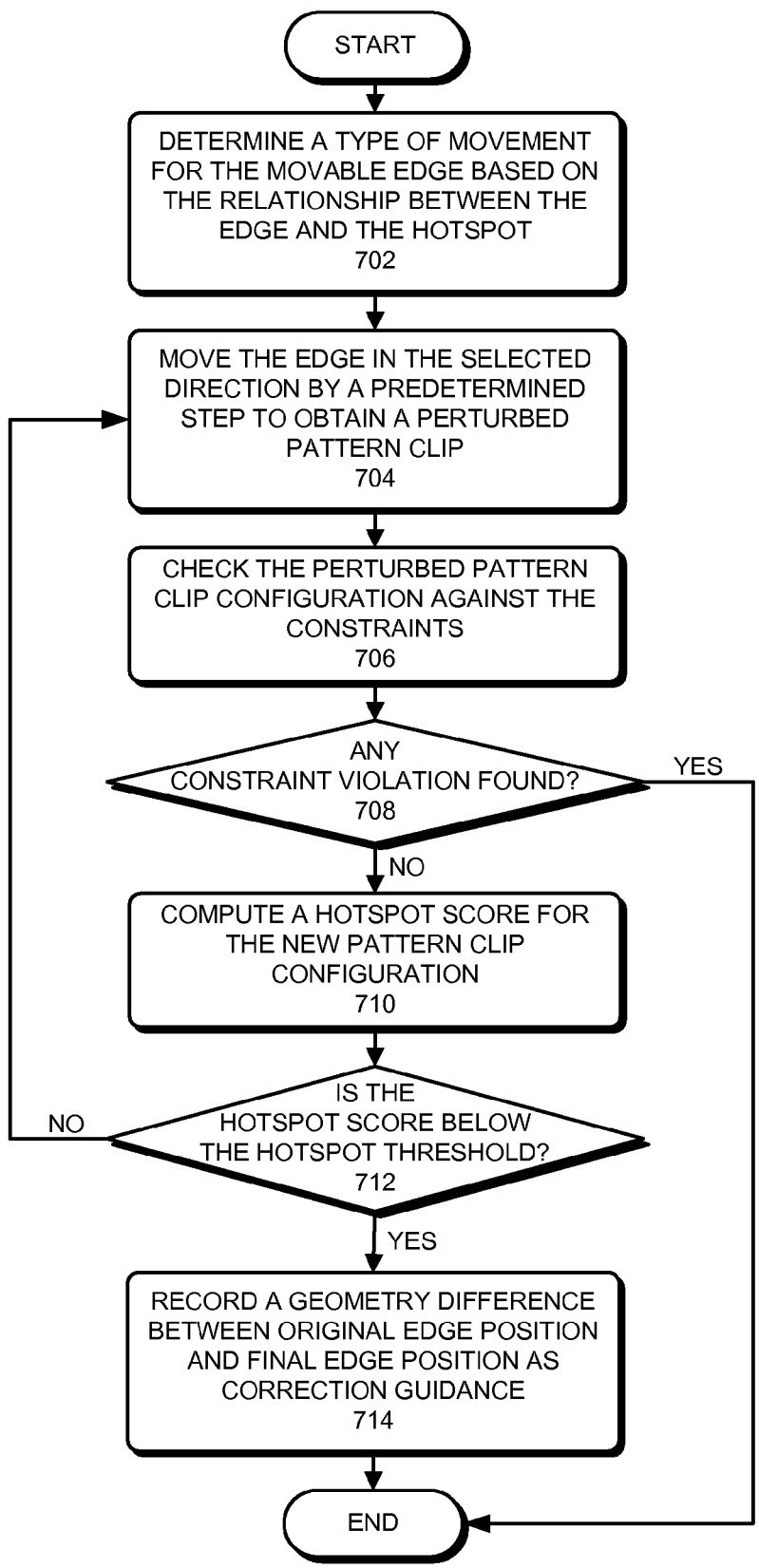
FIG. 7 presents a flowchart illustrating a process for perturbing a movable edge in a trapezoid to determine correction guidance associated with the edge in accordance with an embodiment of the present invention.

FIG. 7 presents a flowchart illustrating a process for perturbing a movable edge in a trapezoid to determine correction guidance associated with the edge in accordance with an embodiment of the present invention. Note that the process illustrated in FIG. 7 is a detailed embodiment of step 608 of FIG. 6.

During operation, the system starts by determining a type of movement for the movable edge based on the relationship between the edge and the hotspot and/or the hotspot type (step 702). Note that each edge can move in two opposite directions; hence, there are two types of movement, wherein typically the two types of movement have different effects on the hotspot. The system can select a movement direction that is more likely to correct the hotspot. For example, edge 334 (i.e., the line-end) in FIG. 3 can move either to the left (i.e., away from hotspot 314) or to the right (i.e., toward hotspot 314). However, only the movement to the left can potentially correct the hotspot. In one embodiment, the system can identify the movement direction based on how the associated hotspot score changes as a result of a small step in one of the two directions. We describe computing hotspot scores in more detail below. Note that by identifying the direction of movement, the system can avoid perturbing the edge in the direction that increases the hotspot score.

Next, the system moves the edge in the selected direction by a predetermined step (i.e., perturbing the edge) to obtain a perturbed pattern clip (step 704). Note that the step size can be determined based on the geometries of the polygons and the pattern clip. The system then checks the perturbed pattern clip configuration against the constraints (step 706). These checks include, but are not limited to, a DRC check and a connectivity check (i.e., determining that there is no disconnection between the set of trapezoids of a polygon). The system then determines whether there is a constraint violation of any type (step 708). If so, the system determines that the selected edge is not associated with possible correction guidance, and the perturbation on the selected edge terminates.

Otherwise, if no constraint violation is found for the perturbed pattern clip, the system then computes a hotspot score for the new pattern clip configuration (step 710). Note that typically each type of hotspot is associated with a hotspot score which defines a range, wherein the hotspot severity goes from minimum to maximum. In one embodiment, the hotspot score is computed as a weighted function of a set of criteria. Furthermore, the minimum hotspot score can be used as the threshold value, wherein below this threshold the hotspot is considered as no longer a valid hotspot. In particular, for lithographic hotspots, the associated hotspot scores are often equivalent to the LCC scores. Consequently, the system can compute the LCC scores by performing an LCC check on the perturbed pattern clip, wherein the LCC check automatically determines the LCC scores.

Next, the system checks to determine whether the new pattern clip configuration has a hotspot score which is below the hotspot threshold (step 712). If so, the system records a geometry difference between original (unperturbed) edge position and final (perturbed) edge position, which geometry difference specifies a correction guidance (step 714). Otherwise, the system returns to step 704 and continues perturbing the edge position in the selected direction. Note that the system repeats steps 704-712 and terminates either because a constraint violation is found (at step 708) or the hotspot score is reduced below the hotspot threshold (at step 712). Note that at the end of the perturbation for the selected edge, the system determines whether the edge is associated with correction guidance or not.

Hence, the above-described perturbation process for searching correction guidance is repeated for each of the movable edges within a selected trapezoid, and repeated for all movable edges associated with all trapezoids in the priority queue. In this embodiment, the system can generate a set of correction solutions for the original pattern clip, wherein each correction guidance is obtained from perturbing a specific edge in the pattern clip and has a correction score. Note that having multiple correction solutions is useful because different design aspects (e.g., lithography, CMP) can have different correction focuses and requirements. A designer can choose a correction solution from the multiple correction solutions which is most suitable for the overall design consideration.

Note that the present invention is not limited to moving one edge of a specific trapezoid at a time. In some embodiments, the system can simultaneously perturb multiple edges associated with multiple trapezoids or multiple edges associated with multiple polygons to search for correction guidance. However, the goal of perturbation is the same: to reduce the hotspot score with new pattern clip configurations.

Figure 8:
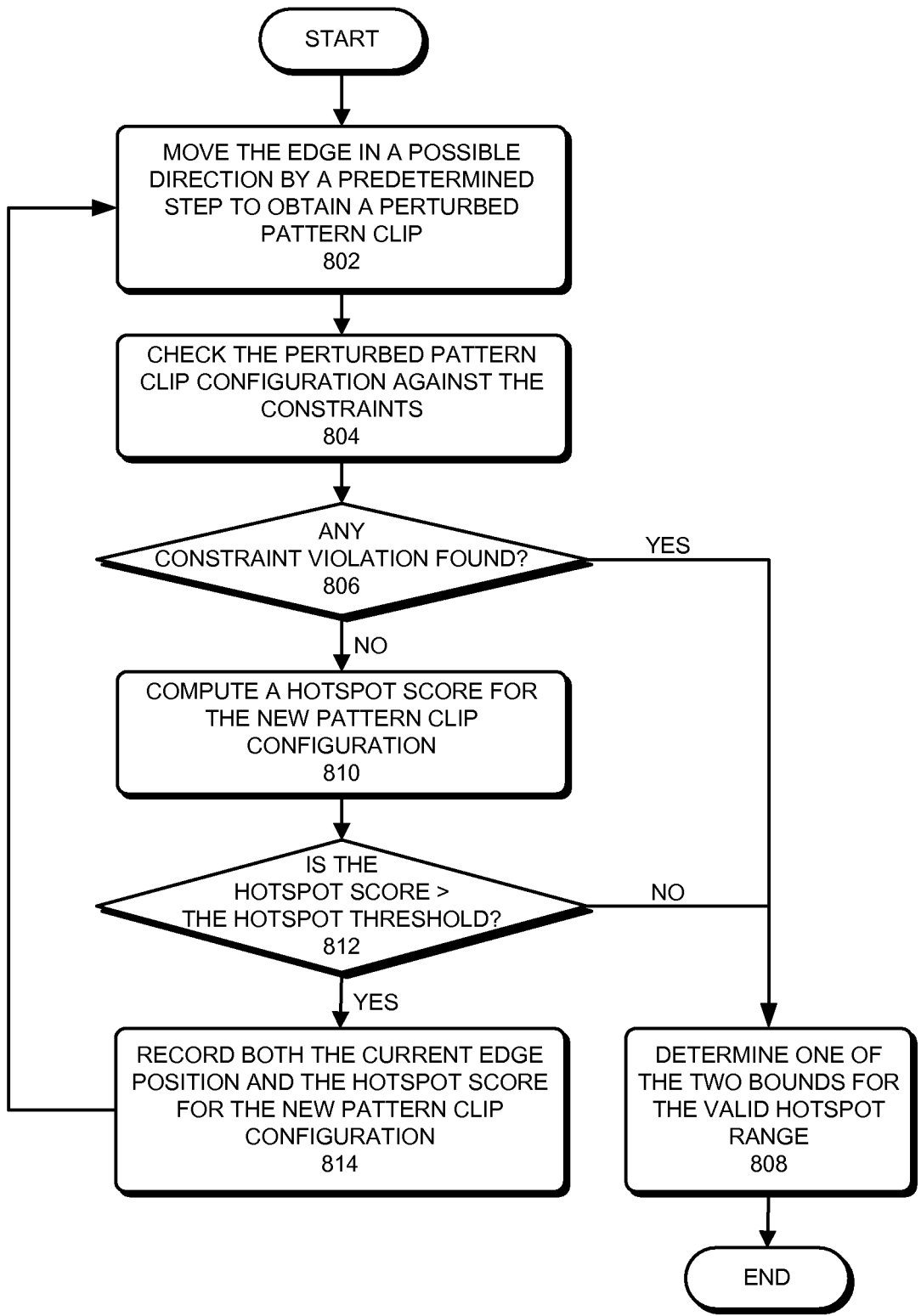
FIG. 8 presents a flowchart illustrating a process of perturbing a movable edge in a trapezoid to determine a valid hotspot range associated with the edge in accordance with an embodiment of the present invention.

FIG. 8 presents a flowchart illustrating a process of perturbing a movable edge in a trapezoid to determine a valid hotspot range associated with the edge in accordance with an embodiment of the present invention. Note that the process illustrated in FIG. 8 is a detailed embodiment of step 610 of FIG. 6.

During operation, the system starts by moving the edge by one predetermined step in a possible movement direction (step 802). Note that to find a valid hotspot range, the system typically searches in all possible movement directions. In some embodiments, the system can examine each movement direction in any given order, or according to a predetermined order.

The system then checks the perturbed pattern clip configuration against the constraints (step 804). These checks include, but are not limited to, a DRC check and a connectivity check (i.e., determining that there is no disconnection between the set of trapezoids of a polygon). The system then determines whether there is a constraint violation of any type in the new configuration (step 806). If so, the system terminates the perturbation process for the current edge in the current direction of movement. Note that at this point the system determines that the previous edge position specifies one of the two bounds for the valid hotspot range (step 808).

Otherwise, if no constraint violation is found in the perturbed pattern clip, the system then computes a hotspot score for the new pattern clip configuration (step 810), and subsequently determines whether the hotspot score is greater than the (hotspot score) threshold (step 812). If so, the new pattern clip configuration remains a valid hotspot, and the system records both the current edge position and the hotspot score for the new pattern clip configuration (step 814). The system then returns to step 802 and continues perturbing the edge position in the current direction.

Otherwise, if the hotspot score is below the threshold, the system terminates the perturbation process for the current edge in the current direction of movement. Note that at this point, the system determines that the previous edge position specifies one of the two bounds of the valid hotspot range.

Note that the system repeats steps 802-814 for both of the edge movement directions and terminates either because a constraint violation is found (at step 806) or the hotspot score is reduced below the hotspot threshold (at step 812). At the end of the process, the system determines a hotspot range which is defined by a minimum edge position and a maximum edge position (MIN, MAX).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically processing manufacturing hotspot information, the method comprising:
   receiving a pattern clip associated with a manufacturing hotspot in a layout, wherein the pattern clip comprises a set of polygons in proximity to the manufacturing hotspot's location;
   determining if the pattern clip matches a known manufacturing hotspot configuration;
   if the pattern clip does not match a known manufacturing hotspot configuration,
      preprocessing the pattern clip, which involves:
         fracturing the set of polygons into a set of primitive geometries;
         selecting a primitive geometry from the set of primitive geometries;
         identifying a set of movable edges for the selected primitive geometry by:
            determining whether an edge of the primitive geometry is an edge created during fracturing or an original edge of the primitive geometry;
            if the edge is created during fracturing, identifying the edge as a non-movable edge; and
            if the edge is an original edge, identifying the edge as a movable edge; and
      performing a perturbation process on the preprocessed pattern clip to:
         determine, by computer, a set of correction recommendations to eliminate the manufacturing hotspot; and
         determine ranges of perturbation to the set of polygons wherein the perturbed pattern clip does not eliminate the manufacturing hotspot; and
   storing the set of correction recommendations and the ranges of perturbation into a manufacturing hotspot database.

2. The method of claim 1, wherein preprocessing the pattern clip further involves:
   identifying a geometrical relationship of the manufacturing hotspot with each of the set of primitive geometries; and
   constructing a priority list for the set of primitive geometries based on the identified geometrical relationship, wherein the priority list determines an order of importance of the set of primitive geometries.

3. The method of claim 1, wherein the set of primitive geometries is a set of trapezoids.

4. The method of claim 1, wherein if the pattern clip matches a known manufacturing hotspot configuration, the method further comprises correcting the pattern clip using a set of correction recommendations associated with the matched manufacturing hotspot configuration.

5. The method of claim 1, wherein performing the perturbation process on the preprocessed pattern clip to determine the set of correction recommendations involves:
   for each identified movable edge, perturbing the movable edge to search for a correction recommendation associated with the movable edge.

6. The method of claim 5, wherein perturbing the movable edge to search for the correction recommendation involves:
   selecting a direction for the movable edge which is likely to reduce the severity of the manufacturing hotspot;
   moving the movable edge in the selected direction by a predetermined amount to obtain a perturbed pattern clip;

computing a hotspot score for the perturbed pattern clip, wherein the hotspot score measures the severity of the manufacturing hotspot;

determining if the hotspot score is less than a threshold;

if so, recording a difference between the unperturbed pattern clip and the perturbed pattern clip as the correction recommendation associated with the movable edge; and otherwise, continuing perturbing the movable edge in the selected direction.

7. The method of claim 6, wherein prior to computing the hotspot score for the perturbed pattern clip, the method further comprises:

checking the perturbed pattern clip against a set of constraints; and if the perturbed pattern clip violates one of the set of constraints, determining that the movable edge is not associated with a corresponding correction recommendation.

8. The method of claim 1, wherein selecting the primitive geometry from the set of primitive geometries involves selecting the primitive geometry based on the associated priority specified in the priority list.

9. The method of claim 1, wherein performing the perturbation process on the preprocessed pattern clip to determine ranges of perturbation to the set of polygons which do not eliminate the manufacturing hotspot involves:

for each identified movable edge, perturbing the movable edge to search for a valid hotspot range associated with the movable edge.

10. The method of claim 9, wherein perturbing the movable edge to search for the valid hotspot range involves searching for both a minimum edge position and a maximum edge position associated with the perturbed movable edge.

11. A non-transitory computer-readable storage medium storing instructions that when executed by a computer cause the computer to perform a method for automatically processing manufacturing hotspot information, the method comprising:

receiving a pattern clip associated with a manufacturing hotspot in a layout, wherein the pattern clip comprises a set of polygons in proximity to the manufacturing hotspot's location;

determining if the pattern clip matches a known manufacturing hotspot configuration;

if the pattern clip does not match a known manufacturing hotspot configuration, preprocessing the pattern clip, which involves:

fracturing the set of polygons into a set of primitive geometries;

selecting a primitive geometry from the set of primitive geometries;

identifying a set of movable edges for the selected primitive geometry by:

determining whether an edge of the primitive geometry is an edge created during fracturing or an original edge of the primitive geometry;

if the edge is created during fracturing, identifying the edge as a non-movable edge; and if the edge is an original edge, identifying the edge as a movable edge; and performing a perturbation process on the preprocessed pattern clip to:

determine a set of correction recommendations to eliminate the manufacturing hotspot; and determine ranges of perturbation to the set of polygons wherein the perturbed pattern clip does not eliminate the manufacturing hotspot; and storing the set of correction recommendations and the ranges of perturbation into a manufacturing hotspot database.

12. The non-transitory computer-readable storage medium of claim 11, wherein preprocessing the pattern clip further involves:

identifying a geometrical relationship of the manufacturing hotspot with each of the set of primitive geometries; and constructing a priority list for the set of primitive geometries based on the identified geometrical relationship, wherein the priority list determines an order of importance of the set of primitive geometries.

13. The non-transitory computer-readable storage medium of claim 11, wherein the set of primitive geometries is a set of trapezoids.

14. The non-transitory computer-readable storage medium of claim 11, wherein if the pattern clip matches a known manufacturing hotspot configuration, the method further comprises correcting the pattern clip using a set of correction recommendations associated with the matched manufacturing hotspot configuration.

15. The non-transitory computer-readable storage medium of claim 11, wherein performing the perturbation process on the preprocessed pattern clip to determine the set of correction recommendations involves:

for each identified movable edge, perturbing the movable edge to search for a correction recommendation associated with the movable edge.

16. The non-transitory computer-readable storage medium of claim 15, wherein perturbing the movable edge to search for the correction recommendation involves:

selecting a direction for the movable edge which is likely to reduce the severity of the manufacturing hotspot;

moving the movable edge in the selected direction by a predetermined amount to obtain a perturbed pattern clip;

computing a hotspot score for the perturbed pattern clip, wherein the hotspot score measures the severity of the manufacturing hotspot;

determining if the hotspot score is less than a threshold;

if so, recording a difference between the unperturbed pattern clip and the perturbed pattern clip as the correction recommendation associated with the movable edge; and otherwise, continuing perturbing the movable edge in the selected direction.

17. The non-transitory computer-readable storage medium of claim 16, wherein prior to computing the hotspot score for the perturbed pattern clip, the method further comprises:

checking the perturbed pattern clip against a set of constraints; and if the perturbed pattern clip violates one of the set of constraints, determining that the movable edge is not associated with a corresponding correction recommendation.

18. The non-transitory computer-readable storage medium of claim 11, wherein selecting the primitive geometry from the set of primitive geometries involves selecting the primitive geometry based on the associated priority specified in the priority list.

19. The non-transitory computer-readable storage medium of claim 11, wherein performing the perturbation process on the preprocessed pattern clip to determine ranges of perturbation to the set of polygons which do not eliminate the manufacturing hotspot involves:

for each identified movable edge, perturbing the movable edge to search for a valid hotspot range associated with the movable edge.

20. The non-transitory computer-readable storage medium of claim 19, wherein perturbing the movable edge to search for the valid hotspot range involves searching for both a minimum edge position and a maximum edge position associated with the perturbed movable edge.

21. A system that generates a pattern-clip-based hotspot database for performing automatic pattern-clip-based layout verification, comprising:
- a receiving mechanism configured to receive a pattern clip associated with a manufacturing hotspot in a layout, wherein the pattern clip comprises a set of polygons in proximity to the manufacturing hotspot's location;
- a determination mechanism configured to determine if the pattern clip matches a known manufacturing hotspot configuration;
- a hardware preprocessing mechanism configured to preprocess the pattern clip, which involves:
  - fracturing the set of polygons into a set of primitive geometries;
  - selecting a primitive geometry from the set of primitive geometries;
  - identifying a set of movable edges for the selected primitive geometry by:
    - determining whether an edge of the primitive geometry is an edge created during fracturing or an original edge of the primitive geometry;
    - if the edge is created during fracturing, identifying the edge as a non-movable edge; and
    - if the edge is an original edge, identifying the edge as a movable edge; and
- a hardware perturbation mechanism configured to perform a perturbation process on the preprocessed pattern clip (if the pattern clip does not match a known manufacturing hotspot configuration) to:
  - determine a set of correction recommendations to eliminate the manufacturing hotspot; and
  - determine ranges of perturbation to the set of polygons wherein the perturbed pattern clip does not eliminate the manufacturing hotspot; and
- a storage configured to store the set of correction recommendations and the ranges of perturbation into a manufacturing hotspot database.

* * * * *